United States Patent
Vlacil et al.

(10) Patent No.: US 12,468,117 B2
(45) Date of Patent: Nov. 11, 2025

(54) BALANCED MIRROR UNIT FOR LASER DEFLECTION DEVICE AND RELATED BALANCING METHOD

(71) Applicant: RAYLASE GmbH, Wessling (DE)

(72) Inventors: Jan Vlacil, Gilching (DE); Matthias Mildner, Munich (DE)

(73) Assignee: RAYLASE GmbH, Wessling (DE)

( * ) Notice: Subject to any disclaimer, the term of this patent is extended or adjusted under 35 U.S.C. 154(b) by 419 days.

(21) Appl. No.: 18/192,112

(22) Filed: Mar. 29, 2023

(65) Prior Publication Data
US 2023/0314761 A1 Oct. 5, 2023

(30) Foreign Application Priority Data
Mar. 30, 2022 (DE) ...................... 10 2022 107 598.2

(51) Int. Cl.
*G02B 7/182* (2021.01)
*G01M 1/36* (2006.01)
*G02B 26/08* (2006.01)

(52) U.S. Cl.
CPC ............. *G02B 7/1821* (2013.01); *G01M 1/36* (2013.01); *G02B 26/0816* (2013.01)

(58) Field of Classification Search
USPC .......................................................... 73/460
See application file for complete search history.

(56) References Cited

U.S. PATENT DOCUMENTS

| | | | | |
|---|---|---|---|---|
| 4,383,763 A | * | 5/1983 | Hutchings | G01C 19/665 356/469 |
| 5,668,655 A | * | 9/1997 | Schweizer | G02B 7/1821 359/872 |
| 2005/0046979 A1 | * | 3/2005 | Hiley | G02B 7/182 359/877 |
| 2013/0027761 A1 | * | 1/2013 | Brown | G02B 7/1821 29/428 |
| 2020/0156313 A1 | * | 5/2020 | Lehmann | B29C 64/268 |
| 2022/0326379 A1 | * | 10/2022 | Humphrey | G01S 17/95 |

FOREIGN PATENT DOCUMENTS

| | | | | |
|---|---|---|---|---|
| CN | 208721889 U | * | 4/2019 | |
| DE | 19928989 C1 | * | 1/2001 | ............. G01M 1/32 |
| DE | 102016114064 A1 | * | 1/2017 | ............. G02B 26/08 |
| JP | 2002006255 A | * | 1/2002 | |

* cited by examiner

*Primary Examiner* — Walter L Lindsay, Jr.
*Assistant Examiner* — Warren K Fenwick
(74) *Attorney, Agent, or Firm* — Eschweiler & Potashnik, LLC (57) ABSTRACT

Examples relate to a method for balancing a mirror unit for a laser deflection device comprising a mirror, a rotor for rotating the mirror around a rotation axis, and a mirror holder holding the mirror to the rotor. The mirror, the rotor, and the mirror holder are balanced using one or more balancing weights to modify a mass distribution of the mirror unit in the mirror plane and/or in a balance plane parallel to the mirror plane and containing the rotation axis. The balancing weights have a centre of mass arranged in the mirror plane and/or in the balance plane and are configured so, when deflecting a laser beam with the mirror on a laser beam position sensor and rotating the mirror unit around the rotation axis, a deviation of a position signal measured by the laser beam position sensor in a direction perpendicular to the mirror plane is reduced.

20 Claims, 7 Drawing Sheets

BALANCED MIRROR UNIT FOR LASER DEFLECTION DEVICE AND RELATED BALANCING METHOD

REFERENCE TO RELATED APPLICATION

This application claims the benefit of German Application number 10 2022 107 598.2, filed on Mar. 30, 2022, the contents of which are hereby incorporated by reference in their entirety.

FIELD

The present invention is in the field of rotating mirrors for laser deflection devices. In particular, the invention refers to a method of balancing a mirror unit comprising a rotating mirror and to a correspondingly balanced mirror unit.

BACKGROUND

The use of rotating mirrors for deflecting a laser beam is ubiquitous in the laser processing industry. Rotating mirrors are used for scanning a laser beam over a surface or workpiece to be laser-processed. A direction in which the laser beam is deflected can be determined by correspondingly rotating one or more deflecting mirrors at which the laser beam is reflected.

Typically, a rotating mirror is connected by a mirror holder to a rotor of a galvanometer or the like, such that a controlled activation of the galvanometer can trigger a corresponding rotation of the rotating mirror.

In order to guarantee the required precision and accuracy of the laser processing, it is necessary to control with precision the rotation of the rotating mirrors. Undesired oscillations, bending and/or vibrations, which can for example be due to an unbalance of the mirror and/or of the components connected thereto, can be factors of inaccuracy. Avoiding these factors of inaccuracy requires a correct balancing of the rotating system. Therefore, methods for balancing different components of a rotating system comprising a rotating mirror have been developed.

At industrial scale, a balancing of the rotor driving the rotation of a rotating mirror is typically performed in a dedicated balancing machine, a so-called balancing bank, based on measurements of centripetal forces obtained at given rotation speeds. The measured centripetal forces allow determining an unbalance of the rotor based on known geometries of the measuring plane and of the unbalance plane.

An alternative to the use of a balancing machine is the so-called "field balancing" technique, whereby trial weights of known mass are placed on a rotating system in operational state to trigger a controlled change in balance. By measuring the resulting vibrations of the rotating system and based on an observed relationship between unbalance and vibrations, it is possible to determine the original unbalance of the rotating system. Correction weights can then be used to balance the rotating system.

Both balancing techniques typically require balancing the rotating mirror in several directions of space and are hence complex processes that may demand a considerable time.

Other known balancing techniques are based on the use of an adhesive paste as a balancing weight, wherein the adhesive paste is attached to the back (non-reflecting) side of a rotating mirror. However, this technique can only be used for rotating mirrors of appropriate material composition. Further, the adhesive paste is prone to uncontrolled changes in its geometry and weight distribution due to temperature variations, for which it fails to provide a fully satisfactory solution.

DE 10 2016 114 064 A1 describes a mirror unit comprising a mirror for deflecting a laser beam, a rotor for rotating the mirror around a rotation axis, and a mirror holder holding the mirror to the rotor. The mirror unit is configured such that a centre of mass of the mirror is arranged on a rotation axis of the mirror, possibly by means of a balancing weight of the mirror and/or of the mirror holder. The mirror holder is made of a low-density porous material. Thereby, an accurate rotation of the mirror and thus a more reliable laser-processing should be achieved. However, the balancing technique disclosed in DE 10 2016 114 064 A1 requires a conventional measurement of the unbalance of the mirror unit, which is technically involved.

JP 2002 6255 A describes a mirror unit comprising two balancing weights configured as setscrews, with one of the balancing weights extending in a plane defined by a mirror of the mirror unit and another one of the balancing weights extending perpendicular thereto.

US 2005/0046979 A1 describes the use of two pairs of set screws for balancing a mirror unit, wherein a first pair of set screws extends in parallel to a plane defined by a mirror of the mirror unit and a second pair of set screws extend perpendicular thereto.

A method for detecting vibrations of a mirror unit is known from DE 199 28 989 C1. Further methods and mirror units are known from CN 208721889 U and from US 2013/0027761 A1.

Thus, there is room for technical improvement in the field of balancing of rotating mirrors for laser deflection devices.

SUMMARY

The present invention aims at solving the problem of improving the balance of a rotating mirror unit of a laser deflection device, in particular overcoming the previously mentioned disadvantages of the balancing techniques known from the prior art. This problem is solved by a method of balancing a mirror unit for a laser deflection device according to claim 1 and by a mirror unit according to claim 9 and by a mirror unit according to claim 17 Preferred embodiments of the invention are defined in the dependent claims.

A first aspect of the invention refers to a method of balancing a mirror unit for a laser deflection device. The laser deflection device can for example be an additive manufacturing module, a 3d printer, a laser cutting module or a laser welding module. "Balancing" may refer herein to an improvement in the balancing of the mirror unit but does not necessarily include a complete balancing of the mirror unit in all directions. Instead, the "balancing" as used herein may refer to a partial balancing, after which vibrations of the mirror unit in one direction, in particular in a direction perpendicular to the mirror plane, may be reduced, in particular as compared to a situation of the mirror unit before the "balancing".

The mirror unit comprises a mirror for deflecting a laser beam, a rotor for rotating the mirror around a rotation axis, and a mirror holder holding the mirror to the rotor. The mirror is hence a rotatable mirror, for example an X- and/or Y-mirror of a laser deflection device. The rotor can in particular be the rotor of a galvanometer or any other motor device configured for driving a rotating movement of the mirror, which is connected to the rotor by means of the mirror holder.

The mirror, in particular at least a reflective mirror surface thereof, extends in a plane parallel to a first direction and to a second direction perpendicular to the first direction, with the first direction being parallel to the rotation axis. The mirror, in particular at least a reflective mirror surface thereof, may be substantially flat. The rotor is configured to rotate the mirror around the rotation axis, which is parallel to the first direction. The first direction may hence correspond to and/or be aligned with the rotation axis. The rotation axis of the mirror may in particular be aligned with the rotation axis of the rotor.

Considering an extension of the mirror in a direction perpendicular to the mirror plane, i.e. considering a thickness of the mirror, in particular for a substantially planar mirror, the aforementioned mirror plane may be defined as a bisectional plane corresponding to a half-thickness of the mirror, such that a thickness of the mirror in said direction perpendicular to the mirror plane equally extends from the bisectional mirror plane in both directions. In other words, the "mirror plane", as used herein, may refer to a plane parallel to the two main side surfaces of the mirror, the front surface and the back surface, one of which may operate as a reflection surface, with said plane being arranged half-way between said two main side surfaces of the mirror. However, the mirror plane may also refer herein to the entire volumetric region arranged between both main surfaces.

Additionally or alternatively, in particular but not only for non-planar or non-flat mirrors, for example for mirrors with a planar or curved mirror surface and a structured back body attached thereto, a balance plane may be defined as a plane containing the rotation axis of the mirror and spaced apart from the mirror plane, possibly parallel thereto, i.e., possibly parallel to a mirror surface of the mirror. The balance plane hence contains the rotation axis around which the mirror is rotatable by the rotor and may be a plane different from the mirror plane, but possibly parallel thereto.

For mirror units with a planar mirror, the mirror plane and the balance plane may be coincident. For mirror units with a non-planar mirror, for example mirror units with a planar mirror surface and a back body attached thereto, the mirror plane and the balance plane may be different, because the rotation axis may be arranged outside the mirror plane. In other words, the balance plane and the mirror plane may be spaced apart, in particular in a direction perpendicular to both planes.

The method comprises modifying a mass distribution of the mirror unit in the mirror plane and/or in the balance plane, in particular a mass distribution of the mirror unit as a whole, i.e., taking into account the mirror, the rotor and the mirror holder, by arranging one or more balancing weights, preferably one or two balancing weights, on the mirror unit, preferably on the mirror holder.

The one or more balancing weights are arranged such that a centre of mass of the one or more balancing weights is arranged in the mirror plane and/or in the balance plane. For example, the one or more balancing weights may be or comprise balancing weights extending in mirror plane and/or in the balance plane. Thus, at least some of the one or more balancing weights, possibly each of them, may be attached to the mirror unit, in particular to the mirror holder, extending in the mirror plane and/or in the balance plane, i.e. having at least one component extending in and/or parallel to the first direction, which is parallel to the rotation axis and to the mirror, and at least one component extending in and/or parallel to the second direction, which is perpendicular to the rotation axis and parallel to the mirror. At least a part of the one or more balancing weights, possibly all of them, may completely extend within the mirror plane and/or within the balance plane and in and/or parallel to the second direction. This may imply that the one or more weights may not significantly protrude in a direction perpendicular to the mirror plane from a thickness of the mirror or from the balance plane. In particular, an extension of the one or more weights in a direction perpendicular to the mirror plane and/or to the balance plane may be much smaller than an extension thereof in one or both directions parallel to the mirror, for example at least twice as small, at least three times smaller, at least five times smaller, at least ten times smaller or even smaller.

Additionally or alternatively, the one or more balancing weights may be or comprise an even number of balancing weights extending symmetrically with respect to the mirror plane and/or to the balance plane. For example, a first balancing weight may extend perpendicular to the rotation axis with an angle A with respect to the mirror plane and/or the balance plane and a second balancing weight may extend perpendicular to the ration axis with an angle-A with respect to the mirror plane and/or the balance plane, i.e. with an angle 2A with respect to the first balancing weight.

In the mirror plane "and/or" in the balance plane refers herein to the fact that, in cases in which the mirror plane and the balance plane are coincident, for example due to the mirror being substantially flat, a centre of mass of the one or more balancing weights may be arranged in the mirror plane "and" also in the balance plane, both planes being coincident. In cases in which the mirror plane and the balance plane are not coincident and are spaced apart, for example in a direction perpendicular to both planes arranged mutually parallel, for example due to the mirror being a non-planar mirror with a structured back-body, a centre of mass of the one or more balancing weights may be arranged in the balance plane without being arranged in the balance plane.

In some embodiments, the method of the invention may be implemented using only balancing weights that extend in the mirror plane and/or in the balance plane and/or only balancing weights that are pairwise symmetric with respect to the mirror plane and/or to the balance plane. In other words, according to some embodiments, no balancing weights that are not arranged extending in the mirror plane and/or in the balance plane or that are not pairwise symmetric with respect to the mirror plane and/or to the balance plane are used for modifying the mass distribution of the mirror unit in the mirror plane according to the method of the invention.

In any case, since the one or more balancing weights are configured such that their centre of mass is arranged in the mirror plane and/or in the balance plane, the one or more balancing weights may affect a mass distribution of the mirror unit (including the one or more balancing weights) only in said plane, while they may leave unaffected the mass distribution of the mirror unit in a direction perpendicular to the mirror plane and/or to the balance plane. The fact that the centre of mass of the one or more balancing weights is arranged in the mirror plane and/or in the balance plane may imply that the net effects of the one or more balancing weights upon the mass distribution of the mirror unit in the direction perpendicular to the mirror plane and/or to the balance plane may cancel out. Thus, an effect of the one or more balancing mirrors upon the mass distribution of the mirror unit in the direction perpendicular to the mirror plane and/or to the balance plane may be zero or negligible.

According to the invention, modifying the mass distribution of the mirror unit in the mirror plane and/or in the balance plane by arranging the one or more balancing weights on the mirror unit, preferably on the mirror holder, comprises: deflecting a laser beam with the mirror on a laser beam position sensor, wherein the laser beam position sensor registers a position of the deflected laser beam on the laser beam position sensor as a position signal. The laser beam position sensor may be any sensor suitable for detecting an incidence point or region of the laser beam deflected by the mirror upon the laser beam position sensor and for generating a position signal indicative of said incidence point or region. The position signal may in particular be a digital signal. The laser beam position sensor may generate a position signal representing a time evolution of a position of the laser beam on a detection surface of the laser beam position sensor and hence corresponding to a time evolution of the rotational position of the mirror.

The laser beam position sensor may preferably be a 2d-positional sensor configured for registering the position of the deflected laser beam on a sensing 2d surface thereof. For example, the laser beam position sensor may be or comprise a so-called Position Sensitive Device sensor (PSD sensor), in particular a 2-D lateral-effect-type PSD).

According to the invention, modifying the mass distribution of the mirror unit in the mirror plane and/or in the balance plane by arranging the one or more balancing weights on the mirror holder further comprises: rotating the mirror around the rotation axis, thereby causing a translation of the position signal in a first sensing direction corresponding to said rotation. Since the laser beam is being deflected by the mirror and the laser beam position sensor is registering the position of the deflected laser beam on the laser beam position sensor as a position signal, rotating the mirror around the rotation axis causes the laser beam to move on the detection surface of the laser beam position sensor in a substantially straight direction perpendicular to the rotation axis. As the mirror is rotated around the rotation axis, in particular driven by the rotor, the laser beam position sensor registers a time-evolution of the position of the incident laser beam. The rotation of the mirror causes a translation of the position signal registered by the laser beam position sensor in the first sensing direction, wherein the first sensing direction may in particular perpendicular to the rotation axis, in particular if the laser beam is not deflected between the mirror and the laser beam position sensor by any intermediate optical element. The greater the angle by which the mirror rotates, the greater the distance the laser beam covers on the laser beam position sensor in the first sensing direction.

A distance between the mirror and the laser beam position sensor may be from 200 mm to 2000 mm, preferably from 300 to 1000 mm. This distance may in particular refer to a distance between the optical centre of the mirror and/or the rotation axis of the mirror and the laser beam position sensor. An optical path followed by the laser beam between the mirror and the laser beam position sensor by any intermediate optical element may be free of any other optical element. In particular, the laser beam may propagate without interruption or deflection between the mirror and the laser beam position sensor.

According to the invention, modifying the mass distribution of the mirror unit in the mirror plane and/or in the balance plane by arranging the one or more balancing weights on the mirror holder further comprises: measuring a deviation of the position signal in a second sensing direction perpendicular to the first sensing direction. A deviation of the position signal in the second sensing direction is not directly caused by the rotation of the mirror but rather by an unbalance of the mirror unit, which may cause the mirror to move in a direction perpendicular to the mirror plane and/or to the balance plane, possibly by bending and/or vibrating, thereby causing the deviation of the position signal in the second sensing direction. The deviation of the position signal in the second sensing direction is hence treated, according to the invention, as indicative of a level of unbalance of the entire mirror unit.

Unbalances of the mirror unit may cause uncontrolled bending and/or vibrations of the rotating mirror unit in a direction perpendicular to the mirror, in particular perpendicular to the mirror plane and/or to the balance plane. Such vibrations are captured by the laser beam position sensor in the form of a deviation of the position signal in the second sensing direction perpendicular to the first sensing direction. For example, the laser beam position sensor may be positioned with respect to the mirror unit such that the laser beam position sensor may register the rotation of the mirror unit as a movement of the position signal in an X-direction of a 2d sensing surface of the laser beam position sensor while the aforesaid oscillations of the mirror unit are captured as corresponding deviations of the position signal in an Y-direction of a 2d sensing surface of the laser beam position sensor perpendicular to the X-direction.

According to the invention, the method further comprises configuring the one or more balancing weights such as to reduce or eliminate the measured deviation of the position signal in the second sensing direction. Thereby, the deviation of the position signal in the second sensing direction is used as a reference for reducing the unbalance of the entire mirror unit. Since the mirror is rotated along with the rest of the mirror unit, the method of the invention takes into account the unbalance generated not only by single components of the mirror unit but by the entire mirror unit, in particular by the group formed by the mirror, the rotor and the mirror holder as a whole.

The present inventors found out that the balance of the mirror unit as a whole may be substantially improved by influencing the mass distribution of the mirror unit in the mirror plane and/or in the balance plane, in particular by correspondingly arranging the one or more balancing weights such that their centre of mass is arranged in said plane, and by setting such mass distribution of the mirror unit in the mirror plane and/or in the balance plane based on the deviation of the position signal captured by the laser beam position sensor in the second sensing direction such that this deviation is eliminated or at least reduced, in particular by 10% or more, preferably by 20% or more, more preferably by 50% or more, possibly by even 75% or more.

Unlike the balancing method described for example in DE 10 2016 114 064 A1, wherein the balancing is based on adjusting the position of a centre of mass of the mirror of a mirror unit, the method of the present invention does not require determining the position of any centre of mass or directly relying thereon. While the position of a centre of mass may be determined for a rigid ideal mirror system, a real mirror system is not perfectly rigid and is subject to bending and vibrating when rotating, such that a balancing method based on setting the position of a centre of mass may be ineffective or unreliable.

Notably, while the requirement that the centre of mass of the one or more balancing weights should be arranged in the mirror plane and/or in the balance plane is defined with respect to a centre of mass, it is not necessary to determine the position of the centre of mass for implementing the method of the invention. Instead, it is possible to ensure that the one or more balancing weights have a centre of mass arranged in the mirror plane and/or in the balance plane by correspondingly configuring the position and orientation of the one or more balancing weights. For example, the balancing weights may be arranged in the mirror plane and/or in the balance plane, in particular extending in and/or parallel to the second direction. Additionally or alternatively, the balancing weights may be or comprise an even number of balancing weights symmetrically arranged with respect to the mirror plane and/or to the balance plane, such that their respective contributions to the mass distribution of the mirror unit in a direction perpendicular to the mirror plane and/or to the balance plane cancel out pairwise.

Thus, the present invention is based on a two-fold technical realisation: Firstly, from an unbalance detection perspective, the inventors realised that it is sufficient for improving the balance of the mirror unit to focus on vibrations and/or bending of the mirror unit in a direction perpendicular to the mirror plane and/or to the balance plane, which are associated to deviation of the position signal in the second sensing direction, in particular from a zero-deviation line corresponding to the first sensing direction. Secondly, from a balancing implementation perspective, the inventors realised that is sufficient for improving the balance of the mirror unit to influence the mass distribution of the mirror unit in the mirror plane and/or in the balance plane by correspondingly configuring the one or more balancing weights.

The present inventors hence realised that, from an unbalance detection perspective, vibrations and/or bending of the mirror unit in directions parallel to the mirror plane and/or to the balance plane may be not as relevant as the vibrations and/or bending of the mirror unit in the direction perpendicular to the mirror plane and/or to the balance plane. Further, from a balancing implementation perspective, the inventors realised that influencing the mass distribution of the mirror unit in directions other than the directions parallel to the mirror plane and/or to the balance plane may be not as relevant as influencing the mass distribution of the mirror unit in the directions parallel to the mirror plane and/or to the balance plane, in particular in and/or parallel to the second direction defined by the mirror plane and/or by the balance plane.

As a result, the method of the invention considerably simplifies the process of balancing a mirror unit and a mirror unit balanced according to this method can have a simpler structure.

According to some embodiments, rotating the mirror unit for configuring the one or more balancing weights on the mirror unit may comprise cyclically rotating the mirror unit, in particular within a predefined angular range. For example, the mirror unit may be cyclically rotated, back and forth, within a predefined angular range of 1° to 40°, preferably of 5° to 25°. "Cyclically" may refer herein to a series of rotations repeated in regular time intervals, whereby in each cycle the mirror unit may be rotated within an exemplary angular range of 22,5° from an initial angular position, for example by 22,5°, forth to an end angular position defined by the predefined angle and back to the initial position, i.e. back to 0°. Alternatively, in each cycle the mirror unit may be rotated from an initial angular position, for example by 11,25°, forth to a first end angular position and then be rotated back, for example by 22,5°, past the initial position, to a second end angular position for example corresponding to −11,25° with respect to the initial position. Since the rotation of the mirror unit may be cyclically repeated under identical circumstances, the deviation of the deviation of the position signal in the second sensing direction may also follow a cyclic pattern. This allows detecting and/or analysing the deviation of the position signal in the second sensing direction as an oscillating, possibly periodic, signal having an amplitude and a phase, for example using an oscilloscope. Using an oscilloscope for this purpose, it may be possible to represent the periodic structure (amplitude and phase) of the deviation as a stationary wave-like signal.

The mirror unit may be rotated back and forth with a predefined rotation speed. The predefined rotation speed may for example be from 5 rad/s to 200 rad/s, preferably from 15 rad/s to 150 rad/s. The mirror unit may be rotated back and forth by the predefined rotation angle periodically, but this needs not be the case.

According to some embodiments, the deviation of the position signal in the second sensing direction perpendicular to the first sensing direction may be measured during a predefined period of time between each two successive rotations of the mirror unit, wherein the mirror unit may remain static (i.e. not rotate driven by the rotor) during the predefined period of time. This means that the cyclic back-and-forth rotational movement of the mirror unit between a starting angular position and an end angular position may include intermediate static resting phases, for example each time the mirror unit rotates back to the starting position, reaches one of the end angular positions or reaches the initial position, which may in particular correspond to a 0°-angle. The mirror unit may remain static for a time corresponding to the predefined period of time before setting in motion again for a new back-and-forth rotational movement. During this predefined period of time, with the rotor not driving any rotation of the mirror, the deviation of the position signal in the second sensing direction can be measured as unwanted oscillations cause the mirror unit to oscillate perpendicularly to the mirror plane and/or to the balance plane, and hence cause the position of the laser beam on the laser beam position sensor to deviate in the second sensing direction. However, it is also possible to measure the deviation of the position signal in the second sensing direction perpendicular to the first sensing direction may be measured while the mirror unit is rotating.

According to some embodiments, configuring the one or more balancing weights such as to reduce or eliminate the measured deviation of the position signal in the second sensing direction may comprise choosing a mass of each of the one or more balancing weights. In some embodiments, at least some of the one or more balancing weights, possibly all of them, may have the same material composition and/or the same density, such that different balancing weights having different masses may differ from each other only by their shape, for example by their length, in which case choosing a mass of the balancing weights may comprise choosing a shape, for example a length, of each of the balancing weights. Additionally or alternatively, configuring the one or more balancing weights such as to reduce or eliminate the measured deviation of the position signal in the second sensing direction may comprise adjusting and/or selecting a position and/or orientation of each of the balancing weights on the mirror unit, in particular on the mirror holder.

By appropriately configuring the one or more balancing weights, for example by selecting the mass of each of them, the measured deviation of the position signal in the second sensing direction can be eliminated or sufficiently reduced so as to guarantee a predefined laser deflection accuracy in absence of disadvantageous vibrations, wobbling and/or bending of the mirror unit.

When the one or more balancing weights are attached to the mirror holder with the centre of mass thereof extending in the mirror plane and/or in the balance plane, the mass distribution of the mirror unit in the mirror plane and/or in the balance plane varies with respect to the mass distribution before incorporating the one or more balancing weights. Consequently, the previously mentioned deviations of the position signal in the second sensing direction will also vary. As the present inventors found out, observing these deviations, for example the variation of the amplitude and phase of the periodic structure of the deviations, it is possible to determine a required configuration of the one or more balancing weights for balancing the mirror unit according to the invention, i.e. such that the deviations are reduced or suppressed. Meanwhile, a variation of the mass distribution of the mirror unit in directions perpendicular to the mirror plane and/or to the balance plane caused by the one or more balancing weights may be zero or negligible.

For instance, as the present inventors found out, after arranging on the mirror holder a first balancing weight having a mass m1 on the mirror holder and extending in a direction perpendicular to the rotation axis and parallel to the mirror (e.g. in the aforesaid second direction), the following applies: if a decrease in the amplitude of the periodic oscillations registered by the laser beam position sensor in the second sensing direction is observed while the phase remains constant, it can be inferred that a balancing weight with a greater mass should be chosen. The first balancing weight can hence be replaced by a balancing weight having a mass m2>m1. If instead an increase in the amplitude of the periodic oscillations registered by the laser beam position sensor in the second sensing direction is observed while the phase remains constant, it can be inferred that the balancing weight should be arranged on the opposite side of the rotation axis. The first balancing weight can hence be removed from one side of the rotation axis and be arranged on the opposite side of the rotation axis. Alternatively, an additional balancing weight having a mass m2>m1 may be arranged on the opposite side of the rotation axis.

If after arranging the first balancing weight having a mass m1 for example on the mirror holder and extending in a direction perpendicular to the rotation axis and parallel to the mirror (e.g. in the aforesaid second direction), a shift of 180° in the phase of the periodic oscillations registered by the laser beam position sensor in the second sensing direction is observed while the amplitude remains constant, it can be inferred that a balancing weight with a smaller mass should be chosen. The first balancing weight can hence be replaced by balancing weight having a mass m2<m1 or a second balancing weight having a mass m2<m1 can be arranged on the mirror holder in front of the first balancing weight, on the other side of the rotation axis, such that both balancing weights are aligned with each other with respect to the direction of the rotation axis (i.e. the aforesaid first direction), extending on opposite sides of the rotation axis in the second direction.

The procedure can be carried forth, modifying, if necessary, the position and/or mass of the one or more balancing weights, until the amplitude of the periodic structure of the deviations of the position signal is reduced below a desired tolerance threshold.

In preferred embodiments, arranging the one or more balancing weights on the mirror unit may comprise fixedly attaching the one or more balancing weights to the mirror unit, in particular to the mirror holder. The one or more balancing weights may for example be configured for being mechanically fixed to the mirror holder, such that their position and/or orientation can be fixed with respect to the mirror holder. However, such fixed attachment of the one or more balancing weights to the mirror holder can be removed. For example, the one or more balancing weights may be configured as or comprise one or more screws screwable into the mirror holder: the position of a screw screwed into the mirror holder is mechanically fixed, but it is possible to replace the screw by another screw, possibly having a different mass.

At least one of the one or more balancing weights, possible some or all of them, may partly or totally extend within the mirror plane, i.e. parallel to the mirror plane, and/or within the balance plane. Preferably, the one or more balancing weights may extend, in particular partly or totally, in the second direction and/or parallel thereto. At least one of the one or more balancing weights, possibly some or all of them, may completely extend within the mirror plane in the second direction, for example extending between the two main surfaces of the mirror. At least one of the one or more balancing weights, possibly some or all of them, may completely extend within the balance plane parallel to the second direction. This may imply that the one or more weights may not significantly protrude from the second direction. For example, at least some or all of the one or more balancing weights may have an elongated shape and may have a longitudinal axis aligned with the second direction when attached to the mirror unit. For example, if the mirror extends in an xz-plane, the one or more balancing weights may extend in the x-direction, in particular mainly in the x-direction.

In preferred embodiments, the mirror holder may comprise one or more threaded openings and the one or more balancing weights may be configured as or comprise one or more screws, preferably as set screws or blind screws, each screw being insertable or screwable into a respective one of the one or more threaded openings. The one or more threaded openings may be or comprise threaded openings oriented in the aforesaid second direction, perpendicular to the rotation axis, and/or within the aforesaid mirror plane and/or within the balance plane. Additionally or alternatively, the one or more threaded openings may be or comprise an even number of threaded openings arranged symmetrically with respect to said mirror plane and/or to the balance plane. Arranging the one or more balancing weights on the mirror holder may then comprise screwing the one or more screws within the respective threaded openings. Possibly, the one or more screws may have different masses and/or different lengths, while all threaded openings may have the same depth and/or diameter.

The one or more balancing weights may comprise at least two, at least three or at four balancing weights. At least two balancing weights may be arranged on opposite sides of the rotation axis. For example, the one or more balancing weights may comprise an even number of balancing weights arranged extending radially and pairwise in front of each other on opposite sides of the rotation axis.

In preferred embodiments of the invention, a mass distribution of the mirror unit, taking into account the mirror, the rotor and the mirror holder, may be modified in the mirror plane and/or in the balance plane by arranging one or two balancing weights on the mirror holder, in particular on opposite sides of the mirror holder, in the aforesaid second direction. Preferably, two balancing weights, which may in particular be two screws, may be arranged in front of each other with respect to the rotation axis. However, the invention also foresees embodiments with one balancing weight and one or more openings, for example two openings, in the mirror holder.

A second aspect of the invention refers to a mirror unit for a laser deflection device such as for example for an additive manufacturing module, for a 3d printer, for a laser cutting module or for a laser welding module. The mirror unit comprises a mirror for deflecting a laser beam, a rotor for rotating the mirror around a rotation axis, and a mirror holder holding the mirror to the rotor. The mirror is hence a rotatable mirror, for example an X- and/or Y-mirror of a laser deflection device. The rotor can in particular be the rotor of a galvanometer or any other motor device configured for driving a rotating movement of the mirror, which is connected to the rotor by means of the mirror holder.

The mirror, which may in some embodiments be a substantially planar mirror, extends in a plane parallel to a first direction and to a second direction perpendicular to the first direction. The first direction is parallel to the rotation axis.

The mirror unit according to the second aspect of the invention is in particular a mirror unit in which the mirror unit as a whole, i.e., the mirror, the rotor and the mirror holder, was balanced by one or more balancing weights configured according to the method of any of the embodiments of the first aspect of the invention. In other words, the mirror unit according to the second aspect of the invention corresponds to a mirror unit that has undergone the method according to any of the embodiments of the first aspect of the invention described above.

The mirror unit hence comprises one or more, preferably one, two, three or four, balancing weights attached to the mirror unit, in particular to the mirror holder, wherein a centre of mass of the one or more balancing weights is arranged in the mirror plane and/or in the balance plane. For example, the one or more balancing weights may be or comprise balancing weights extending and/or arranged in said plane, i.e., in the mirror plane and/or in the balance plane, preferably extending in the second direction and/or parallel thereto. At least some or all of the one or more balancing weights may totally extend and/or be arranged in said plane, in particular in the second direction, possibly without substantially protruding from a thickness of the corresponding plane or from the second direction, respectively. The one or more weights may hence extend substantially in parallel to the mirror and/or to the balance plane. For example, at least some or all of the one or more balancing weights may have an elongated shape and may have a longitudinal axis aligned with the second direction.

Additionally or alternatively, the one or more balancing weights may be or comprise an even number of balancing weights extending pairwise symmetrically with respect to the mirror plane (in which the mirror extends) and/or with respect to the balance plane. For example, a first balancing weight may longitudinally extend perpendicular to the rotation axis with an angle A with respect to the mirror plane and/or to the balance plane and a second balancing weights may longitudinally extend perpendicular to the ration axis with an angle-A with respect to the mirror plane and/or to the balance plane, i.e. with an angle 2A with respect to the first balancing weight.

An overall balance of the mirror unit is improved by means of the one or more balancing weights with respect to a situation in which the one or more weights were not present. The one or more balancing weights implement a balancing of the mirror unit, in particular in the mirror plane and/or in the balance plane. According to the invention, the one or more balancing weights are configured such that when a laser beam is deflected with the mirror upon a laser beam position sensor registering a position of the deflected laser beam on the laser beam position sensor as a position signal and the mirror unit is rotated around the rotation axis thereby causing a translation of the position signal in a first sensing direction corresponding to said rotation, a deviation of the position signal in a second sensing direction perpendicular to the first sensing direction is smaller than in absence of the one or more balancing weights, for example at least twice as small, at least three times smaller, at least five times smaller, at least ten times smaller or even smaller.

In other words, the presence of the one or more balancing weights guarantees that the mass distribution of the mirror unit in the mirror plane and/or in the balance plane is such that the deviation of the position signal in the second sensing direction of the laser beam position sensor is reduced (or eliminated) as compared to the situation in which the mirror unit were not equipped with the one or more balancing weights. This may imply that, by virtue of the one or more balancing weights, vibrations, oscillations and/or bending of the mirror unit in a direction perpendicular to the mirror plane and/or to the balance plane are correctly compensated by the one or more balancing weights, as indicated by the laser beam position signal, whereby a proper dynamic behaviour of the mirror unit is ensured.

Thus, for a mirror unit according to the second aspect of the invention, the deviation measured by the laser beam position sensor in the second sensing direction for rotations of the mirror unit around the rotation axis may for example increase upon removal of one, some or all of the one or more balancing weights.

According to some embodiments, the mirror unit may be free of any balancing weights that are not arranged extending in the mirror plane and/or in the balance plane or that are not pairwise symmetric with respect to the mirror plane and/or to the balance plane.

According to preferred embodiments of the invention, said deviation of the position signal in the second sensing direction, in particular measured as a peak-to-peak deviation, for example corresponding to twice the amplitude of a periodical signal, such as such as a sinusoidal signal, measured by an oscilloscope measuring the signal deviation of the position signal in the second sensing direction, may correspond to an angular deviation smaller than 1 minute (smaller than 0° 1', i.e. smaller than $\frac{1}{60}$ of 1°), preferably smaller than 30 seconds (smaller than 0° 0' 30", i.e. smaller than $\frac{1}{120}$ of 1°), more preferably smaller than 15 seconds (smaller than 0° 0' 15", i.e. smaller than $\frac{1}{240}$ of 1°), in particular when the mirror unit is rotated about a predefined rotation angle of 1° to 40°, preferably of 5° to 25° and/or at a rotation speed from 5 rad/s to 200 rad/s, preferably of 15 rad/s to 150 rad/s. This means that when the mirror unit according to the second aspect of the invention is rotated, in particular under the aforementioned rotation conditions, thereby causing a corresponding translation of the position signal on the sensing surface of the laser position signal in the first sensing direction, an angular deviation of the laser beam in the second sensing direction perpendicular to the first sensing direction may correspond to an angle in the aforementioned ranges, wherein an angle of 0° 0' 0" may correspond to a zero-deviation in the Y-direction.

In other words, the one or more balancing weights of the mirror unit may be configured such that, if the method of the first aspect of the invention were to be performed on the mirror unit, the deviation detected in the second sensing direction would correspond to an angular deviation smaller than 0° 1', smaller than 0° 0' 30" or even smaller than 0° 0' 15" which ensures a sufficiently good balancing of the entire mirror unit to the extent of significantly reducing the undesired wobbling of the mirror unit in the direction perpendicular to the mirror plane and/or to the balance plane, thereby guaranteeing an improved laser quality.

In preferred embodiments of the invention, a distance between the mirror and the laser beam position sensor during the detection may be from 200 mm to 2000 mm, preferably from 300 mm to 1000 mm, more preferably from 400 mm to 800 mm.

In preferred embodiments, the one or more balancing weights may be fixedly attached to the mirror unit, in particular to the mirror holder. Thus, a position and/or orientation of each of the one or more balancing weights with respect to the mirror holder may be mechanically fixed, although it can possibly be adjusted. Thus, a position of the one or more balancing weights with respect to the mirror holder may be fixed while being changeable. For example, the one or more balancing weights may be or comprise one or more screws completely screwed into the mirror, such that a final position of the corresponding screw with respect to the mirror holder is predefined by the depth and orientation of the respective threaded opening in which it is received. The fixed attachment of the one or more balancing weights to the mirror holder provides additional mechanical stability and thereby simplifies the balancing. Given a predefined position of the one or more balancing weights, an appropriate selection of the mass and/or size of each of the one or more balancing weights may allow configuring the one or more balancing weights according to the invention such as to reduce or eliminate the deviations of the laser beam position signal measured by the laser beam position sensor in the second sensing direction as compared to a situation with no balancing weights.

In some embodiments, the mirror holder may comprise one or more openings, preferably one or two, for receiving the one or more balancing weights or of screw parts thereof, wherein each of the one or more balancing weights may in particular be received in one respective opening, and the one or more openings may extend perpendicular to the rotation axis, for example in the second direction. This orientation of the openings determines a corresponding orientation of the one or more balancing weights, which simplifies the task of correctly balancing the mirror, the rotor and the mirror holder with respect to each other such according to the principles of the invention such that a deviation of the position signal in a second sensing direction perpendicular to the first sensing direction is smaller than in absence of the one or more balancing weights. For instance, in the aforementioned example in which the one or more balancing weights may be configured as screws screwed into the mirror holder, the screws may be screwed, in particular completely screwed, into threaded openings of the mirror holder formed in a direction perpendicular to the rotation axis.

Preferably, a subset of the openings of the mirror holder or all of them may have the same depth and/or the same diameter. Consequently, if a corresponding subset or all of the one or more balancing weights are made of the same material, hence having the same density, balancing weights having different masses will have the same diameter, corresponding to the diameter of the openings, and may only differ in their extension in a longitudinal direction, which may correspond to the depth of the openings. In other words, balancing weights having different masses may differently protrude from the openings of the mirror holder, wherein a balancing weight having a greater mass may protrude further from the respective opening in the mirror holder than a balancing weight having a smaller mass. Further, the one or more openings of the mirror holder may be evenly spaced with respect to each other. For example, in the case of two openings, the two openings may be arranged in front of each other, on opposite sides of the rotation axis, in particular aligned in the second direction.

The one or more openings, which may in particular be or comprise threaded openings, may be or comprise openings oriented in the aforesaid second direction, perpendicular to the rotation axis, and/or within the aforesaid mirror plane and/or within the balance plane. Additionally or alternatively, the one or more threaded openings may be or comprise an even number of threaded openings arranged symmetrically with respect to said mirror plane and/or to the balance plane.

In some embodiments, the one or more balancing weights may be attached to the mirror unit, in particular to the mirror holder, extending and/or arranged perpendicular to the rotation axis, preferably in the second direction. For instance, if the mirror has a substantially rectangular or oval shape and its rotation axis corresponds to a major (longitudinal) axis of the rectangular or oval mirror, the first direction may be parallel to said major (longitudinal) axis of the mirror (and to the rotation axis) while the second direction may be parallel to the minor (transversal) axis of the mirror. According to such example, the one or more balancing weights may be arranged within the mirror plane, i.e. without substantially protruding from the mirror plane perpendicularly, and extending in the second direction, for example being elongated and having a longitudinal axis extending in the second direction. According to a further example, the one or more balancing weights may be arranged within the balance plane, i.e. without substantially protruding from the balance plane, and extending parallel to the second direction, for example being elongated and having a longitudinal axis extending parallel to the second direction. The aforementioned openings of the mirror holder may be formed accordingly.

Thus, at least some of the one or more balancing weights, possibly all of them, may extend from the mirror holder in the second direction or parallel thereto. This configuration simplifies the task of correctly setting the mass distribution of the mirror unit in the second direction according to the principles of the invention such that a deviation of the position signal in a second sensing direction perpendicular to the first sensing direction is smaller than in absence of the one or more balancing weights. As the present inventors found out, the position of the one or more balancing weights in said second direction proves most efficient for reducing undesired vibrations of the mirror unit in a direction perpendicular to the mirror plane and/or to the balance plane.

For instance, the one or more balancing weights may be configured as screws screwed into the mirror unit, in particular into the aforementioned threaded openings, wherein the mirror may have a substantially flat rectangular or oval shape with its rotation axis corresponding for example to a major (longitudinal) axis of the rectangular or oval mirror aligned with the first direction. In such case, the screws may be completely screwed into threaded openings of the mirror holder extending in the second direction. Thus, the screws received in the respective openings correspondingly extend in the second direction, i.e. in a direction parallel to the mirror and perpendicular to the rotation axis. Additionally or alternatively, the one or more balancing weights may be configured as balancing weights with predefined mass and shape attachable to the mirror holder using corresponding attaching elements, in particular attaching screws.

Preferably, the one or more balancing weights may be configured as one or more screws, in particular set screws and/or blind screws, insertable or inserted (preferably completely) into respective threaded openings in the mirror holder. The number of balancing weights and of corresponding threaded openings may preferably be one two, three or four. The one or more threaded openings may in particular be arranged perpendicular to the rotation axis, possibly aligned with the aforementioned second direction defined by the mirror. This configuration of the one or more balancing weights easily allows a fine adjustment of the position of the one or more balancing weights with respect to the mirror holder and appropriately choosing the mass of the balancing weights while guaranteeing mechanical stability thanks to the threaded mechanism. The balancing process may be simplified by the fact that the relative arrangement of the balancing weights with respect to the mirror holder may be predefined by the depth of the corresponding threaded openings, which may all have the same depth and/or diameter, such that only the mass (possibly only the length) of the different balancing weights may be a factor of variability.

In preferred embodiments of the invention, the one or more balancing weights may be or comprise two balancing weights arranged on opposite sides of the rotation axis. The invention allows reducing the number of balancing weights to just two, possibly even just one, for obtaining the desired mass distribution of the mirror unit in the mirror plane and/or in the balance plane.

According to preferred embodiments of the invention, the one or more balancing weights may be arranged in front of each other (aligned with each other) with respect to the rotation axis (e.g. with respect to the first direction defined above). This implies that the one or more balancing weights may extend aligned with each other, in particular pairwise, for example parallel to the second direction. The invention allows using balancing weights at a single position along the rotation axis, such that it is not necessary to arrange and adjust different balancing weights at different axial positions. For example, in embodiments in which the number of balancing weights is just two, the two balancing weights can be placed in front of each other with respect to the rotation axis and still allow correctly balancing the mirror unit as a whole according to the principles of the invention such that a deviation of the position signal in a second sensing direction perpendicular to the first sensing direction is smaller than in absence of the one or more balancing weights.

A method of manufacturing a mirror unit for a laser deflection device according to the invention, in particular a mirror unit balanced by the method of any of the embodiments of the first aspect of the invention and/or a mirror unit according to any of the embodiments of the second aspect of the invention, may comprise:
  providing a mirror for deflecting a laser beam, wherein the mirror extends in a mirror plane parallel to a first direction and to a second direction perpendicular to the first direction;
  coupling the mirror to a rotor using a mirror holder, wherein the mirror holder holds the mirror to the rotor and wherein the rotor is configured for rotating the mirror around a rotation axis parallel to the first direction;
  providing one or more balancing weights arrangeable on the mirror unit;
  deflecting a laser beam with the mirror upon a laser beam position sensor registering a position of the deflected laser beam on the laser beam position sensor as a position signal and rotating the mirror unit around the rotation axis thereby causing a translation of the position signal in a first sensing direction corresponding to said rotation, and
  configuring the one or more balancing weights arranged on the mirror unit, in particular on the mirror holder, wherein a centre of mass of the one or more balancing weights (20a, 20b) is arranged in said mirror plane and/or in a balance plane containing the rotation axis, such that a deviation of the position signal in a second sensing direction perpendicular to the first sensing direction is smaller than in absence of the one or more balancing weights.

DETAILED DESCRIPTION

For the purposes of promoting an understanding of the principles of the invention, reference will now be made to specific preferred embodiments illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to someone skilled in the art to which the invention relates within the scope defined by the claims.

Figure 1:
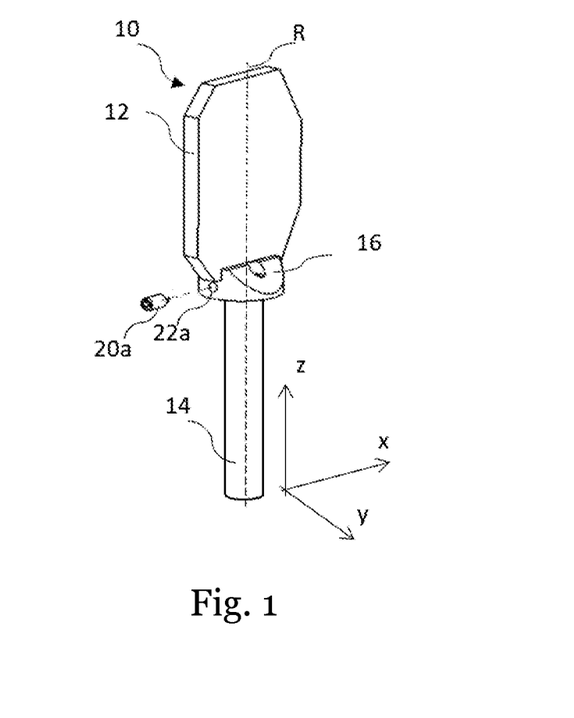
FIG. 1 shows a schematic perspective view of a mirror unit according to the invention.
Figure 2:
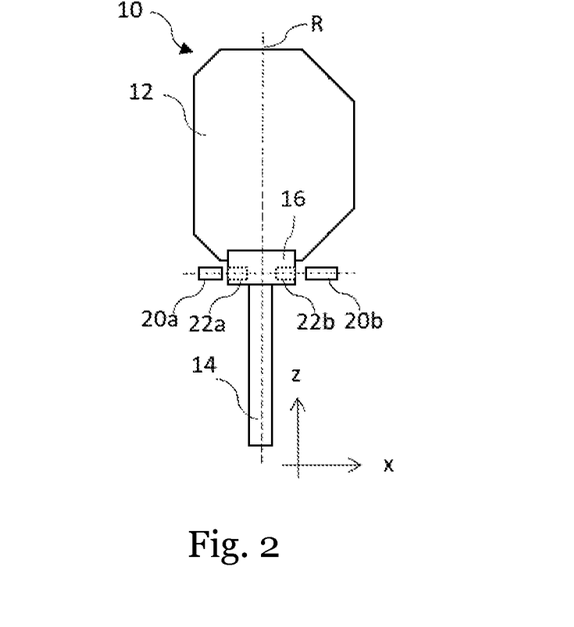
FIG. 2 shows a schematic front view of the mirror unit of FIG. 1.

FIGS. 1 and 2 shows schematic illustrations of a mirror unit 10 according to the invention in different views. FIG. 1 shows a 3d perspective view while FIG. 2 shows a top view in a 2d xz-plane. The mirror unit 10 is configured for being used within a laser deflection device (not shown) for deflecting a laser beam used by the device for laser processing a workpiece.

The mirror unit 10 comprises a mirror 12 for deflecting the laser beam, a mirror holder 16 that holds the mirror 12 and a rotor 14 configured for rotating the mirror 12 around a rotation axis R. The mirror holder 16 holds the mirror 12 to the rotor 14, such that the rotor 14, the mirror holder 16 and a 12 can rotate simultaneously, rigidly coupled to each other.

Figure 3:
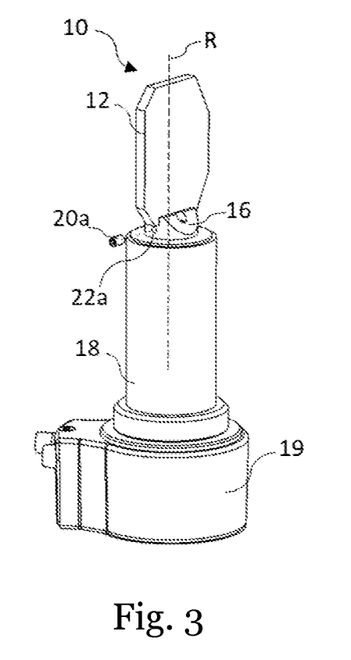
FIG. 3 shows a schematic view of the mirror unit of FIGS. 1 and 2 mounted to a galvanometer.

The rotor 14 can be the rotor of an electromagnetic motor unit configured for driving the rotation of the mirror unit 10. The electromagnetic motor unit can for example be a galvanometer. FIG. 3 illustrates an exemplary embodiment of the mirror system according to the invention (corresponding to the mirror system illustrated in FIGS. 1 and 2) wherein the rotor is coupled to a galvanometer 18 configured for driving a rotation of the rotor 14 (not visible in FIG. 3), the mirror holder 16 and the mirror 12.

In the exemplary embodiments illustrated in FIGS. 1 to 3, the mirror 12 has an irregular octagonal shape. However, the mirror 12 may have any suitable shape in other embodiments, for example a rectangular shape or an oval shape. In the exemplary embodiments illustrated in FIGS. 1 to 3, the mirror 12 has a substantially flat shape, with dimensions extending in the x- and z-directions being considerably larger than a thickness of the mirror 12 in the y-direction perpendicular to the xz-plane.

As seen in greater detail in FIG. 2, the mirror unit 10 comprises two balancing weights 20*a*, 20*b* that can be received in corresponding openings 22*a*, 22*b* that are formed in the mirror holder 16. The balancing weights 20*a*, 20*b* can be set screws and the openings 22*a*, 22*b* can be threaded openings having a thread profile matching a thread profile of the balancing weights 20*a*, 20*b*. Such set screws can be completely threaded into the threaded openings 22*a*, 22*b* such that their position with respect to the mirror holder 16 is mechanically fixed by the thread mechanism. Notably, in other mirror units 10 according to the invention, only one of the balancing weights 20*a*, 20*b* and/or only one of the openings 22*a*, 22*b* may be present.

In related embodiments, the balancing weights can comprise screws functionally corresponding to the set screws 20*a*, 20*b*, wherein the balancing weights may have different shapes (not necessarily the shape of a set screw as a whole) and wherein the screws may form a portion of the corresponding balancing weight.

As seen in FIG. 2, the threaded openings 22*a*, 22*b* are arranged in the mirror plane, i.e. in the xz-plane, and extend in the x-direction away from the rotation axis R, on opposed sides of the rotation axis R and in front of each other. Thus, when the balancing weights 20*a*, 20*b* are arranged (e.g. threaded) within the openings 22*a*, 22*b*, a longitudinal direction of the balancing weights 20*a*, 20*b* extends in the x-direction and the two balancing weights extend away from each other and away from the rotation axis R on opposite sides thereof.

Figure 5:
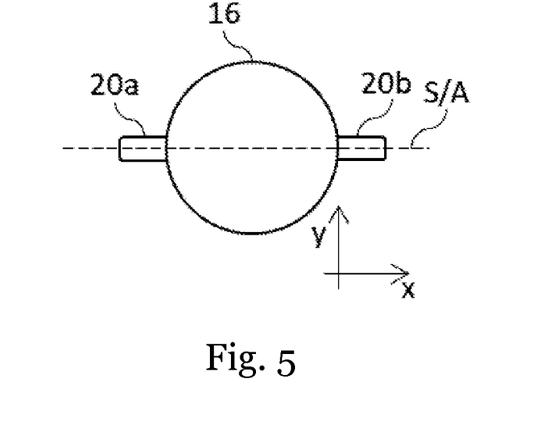
FIG. 5-7 show schematic cross-sectional views of a respective mirror unit with one or more balancing weights arranged according to a respective embodiment of the invention.

FIG. 5 shows a cross-sectional view of the mirror unit of FIGS. 1-3 in the cross-sectional xy-plane showing the mirror holder 16 and the arrangement and orientation of the two balancing weights 20*a*, 20*b*. Since the two balancing weights 20*a*, 20*b* extend in the xz-plane S, in particular in the x-direction, a centre of mass thereof is arranged in the xz-plane S. The extensions of the balancing weights 20*a* and 20*b* in the x-direction can be different. Thus, the balancing weights 20*a*, 20*b* influence the mass distribution of the mirror unit 10 in the xz-plane S, in the y-direction, but not (or only negligibly) in the y-direction.

As explained below, in other embodiments, the plane indicated in FIG. 5 (and in each of FIGS. 6-7) with a dashed line, may correspond to the balance plane instead of or in addition to the mirror plane, for which the plane is indicated using the reference S/A in the drawings, which stands for mirror plane S and/or balance plane A.

In the exemplary embodiment under consideration, the threaded openings 22*a*, 22*b* have a depth in the x-direction of 3 mm and a diameter in the yz-plane perpendicular to the x-direction of 1.57 mm, corresponding to the ISO metric screw size M2. The balancing weights 20*a*, 20*b* have diameter corresponding to the diameter of the threaded openings 22*a*, 22*b*. The balancing weights 20*a*, 20*b* have the same material composition (the same density). Thus, a difference in length, shape and/or thickness between one balancing weight 20*a* and the other 20*b* implies a difference in their respective masses.

Figure 6:
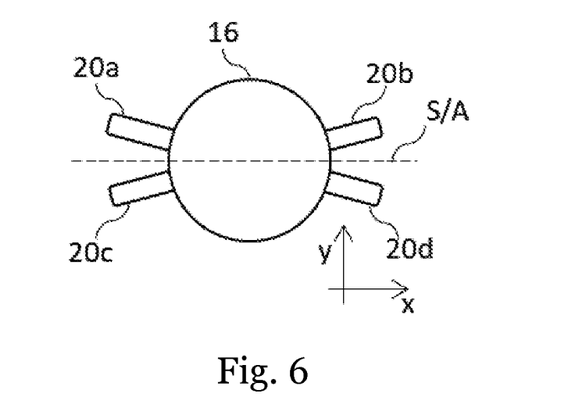
Figure 7:
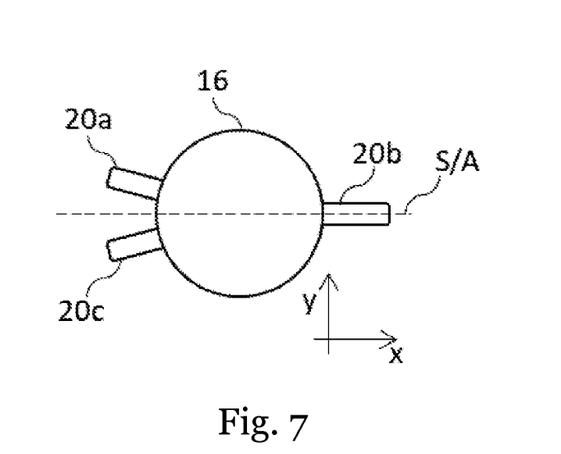

FIGS. 6 and 7 illustrate other cross-sectional views in the cross-sectional xy-plane of mirror units according to the invention having a different number and a different arrangement of balancing weights as compared to the mirror unit shown in FIGS. 1-3 and 5.

FIG. 6 shows an exemplary arrangement of four balancing weights 20*a*, 20*b*, 20*c* and 20*d* on the mirror holder 16. The balancing weights are arranged into respective openings (not shown) formed in the mirror holder 16. The balancing weights 20*a*, 20*b*, 20*c* and 20*d* are not arranged in the xz-plane S and are not parallel thereto. However, the balancing weights are configured being pairwise symmetric with respect to the xz-plane S: the balancing weights 20*a* and 20*c* are symmetrically arranged with respect to the xz-plane S and so are the balancing weights 20*b* and 20*d*. The mass distribution contribution of the balancing weights 20*a* and 20*c* in the y-direction perpendicular to the xz-plane S cancel each other and so do the mass distribution contributions of the balancing weights 20*b* and 20*d* in the same direction. In other words, the balancing weights 20*a* and 20*c*, in combination, and the balancing weights 20*b* and 20*d*, in combination, represent a respective net contribution to the mass distribution of the mirror unit in the xz-plane S, having substantially no effect upon the mass distribution of the mirror unit in the y-direction. Consequently, the centre of mass of the balancing weights 20*a*, 20*b*, 20*c* and 20*d* is arranged in the xz-plane S. Thus, the balancing weights 20*a*, 20*b*, 20*c* and 20*d* influence the mass distribution of the mirror unit 10 in the xz-plane S, in particular the x-direction, but not (or only negligibly) in the y-direction.

FIG. 7 shows a related exemplary arrangement of three balancing weights 20*a*, 20*b* and 20*c* on the mirror holder 16. The balancing weights are arranged into respective openings (not shown) formed in the mirror holder 16. The balancing weights 20*a* and 20*c* are not arranged in the xz-plane S and are not parallel thereto, while the balancing weight 20*b* is. However, the balancing weights 20*a* and 20*c* are configured being symmetric with respect to the xz-plane, such that their mass distribution contributions in the y-direction cancel each other. Consequently, the centre of mass of the balancing weights 20*a*, 20*ba* and 20*c* is arranged in the xz-plane S. Thus, the balancing weights 20*a*, 20*b* and 20*c* influence the mass distribution of the mirror unit 10 in the xz-plane S, in particular the x-direction, but not (or only negligibly) in the y-direction.

Figure 8:
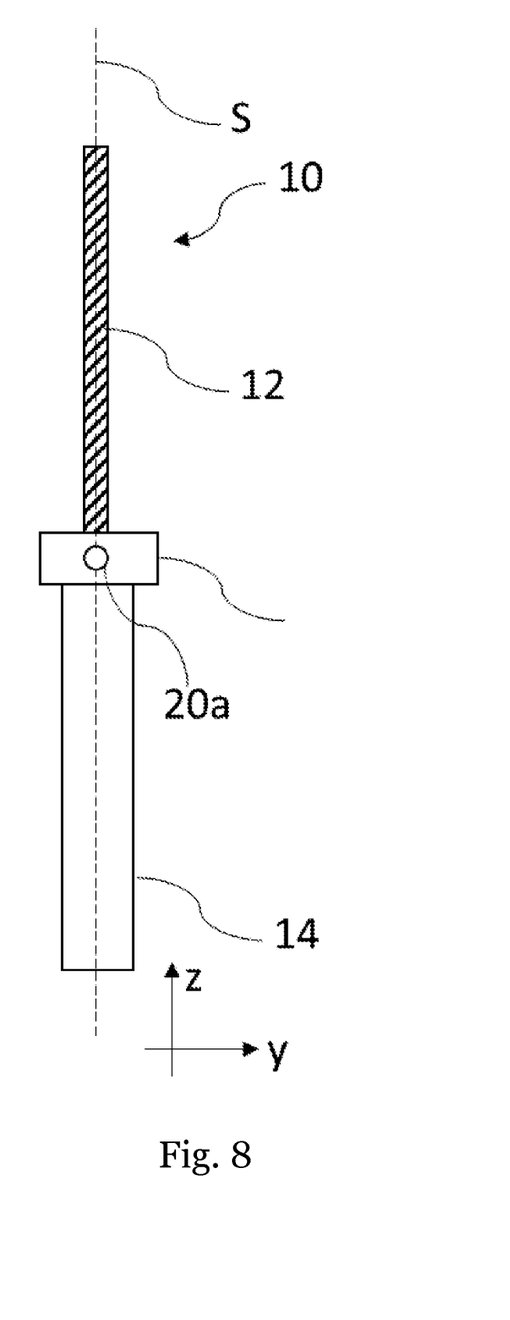
FIG. 8 shows a schematic side view of the mirror unit of FIG. 1.

FIG. 8 shows a schematic side view of the mirror unit 10 of the embodiment shown in FIGS. 1-3 and 5, wherein the plane S corresponds to the mirror plane, i.e., to the xz-plane in which the planar mirror 12 extends. As seen in FIG. 8, the balancing weights 20*a* (and 20*b*, not shown) are arranged within the mirror plane S, for which a centre of mass thereof lies in the mirror plane S.

Figure 9:
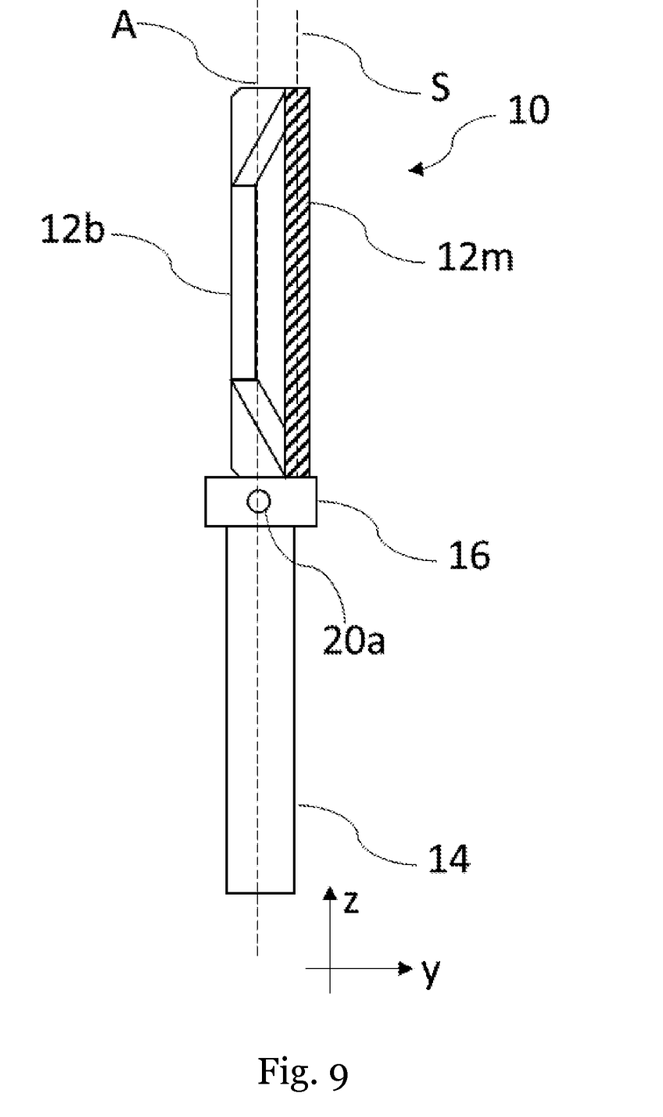
FIG. 9 shows a schematic side view of a mirror unit according to another embodiment of the invention.

FIG. 9 shows, for comparison with FIG. 8, a similar schematic side view but for an embodiment in which the mirror unit 10 comprises a non-planar mirror comprising a reflective mirror surface 12*m* and a structured back-side body 12b on which the mirror surface 12m is attached. The mirror surface 12m, which extends in the x and z directions, in a first xz-plane, defines the mirror plane S. In a second xz-plane, parallel to the mirror plane S and spaced apart from it along the y direction, there is a balancing plane A, within which the balancing weight 20a (and possibly other balancing weights like a second balancing weight 20b) is arranged. The rotation axis R is contained within the balance plane A, spaced apart from the mirror plane S. In the embodiment illustrated in FIGS. 1-3, 5 and 8, the mirror plane S is indistinguishable from the balancing plane A due to the mirror 12 being a planar mirror. However, in the alternative configuration illustrated in FIG. 9, in which the mirror is non-planar, the principles of the invention are achieved by using one or more balancing weights, for example according to any of the configurations shown in FIGS. 5-7 but replacing the mirror plane S by the balancing plane A, for influencing a mass distribution of the mirror unit in the balance plane A, wherein a centre of mass of the one or more balancing weights (e.g. of balancing weights 20a and 20b and possibly further balancing weights), is arranged in the balance plane A.

FIGS. 4 and 10 to 14 illustrate the principles of a method according to the invention for balancing a mirror unit, for example the mirror unit 10 illustrated in FIGS. 1 to 3. The skilled person will understand that the method equally applies to configurations in which the balance plane A and the mirror plane S are different planes, as illustrated in FIG. 9.

Figure 4:
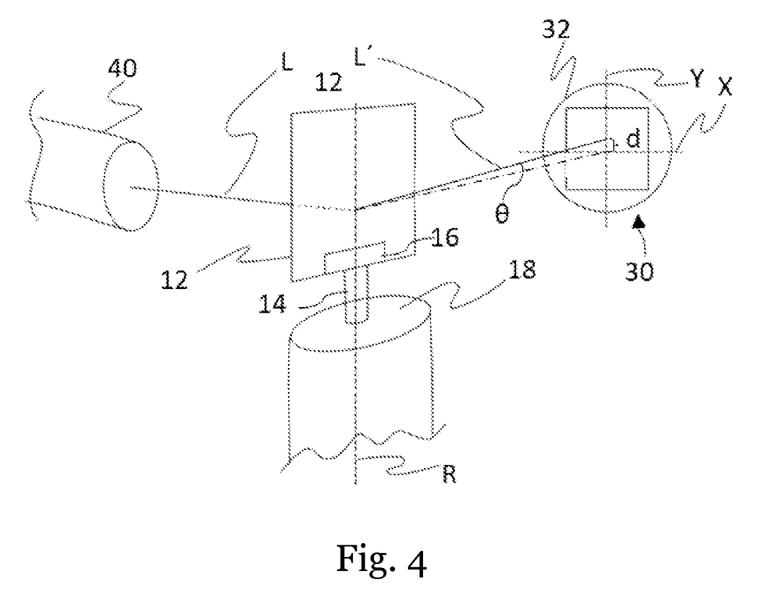
FIG. 4 shows a schematic illustration of setup for balancing a mirror unit with a method according to an embodiment of the invention.

As schematically illustrated in FIG. 4, a laser beam L generated by a laser source 40 is deflected by the mirror 12 of the mirror unit 10 and is directed to a laser beam position sensor 30, such that the deflected laser beam L' falls upon a 2d sensing surface 32 of the laser beam position sensor 30. In the exemplary embodiment shown in FIG. 4, the laser beam position sensor 30 can be a 2-D lateral-effect-type PSD sensor. A position of the deflected laser beam L' on the 2d sensing surface 32 is registered by the laser beam position sensor 30 as an electronic position signal represented by an X-coordinate and a Y-coordinate corresponding to a first the sensing direction X and to a second sensing direction Y on the sensing surface 32, respectively.

When the galvanometer 18 drives a rotation of the rotor 14 and hence also of the mirror holder 16 and the mirror 12, the direction in which the deflected laser beam L' is directed varies as the mirror unit 10 rotates around the rotation axis R and this is registered by the laser beam position sensor 30 as a translation of the position signal along the X-coordinate, perpendicular to the rotation axis R.

The galvanometer 18 can be controlled, for example by a correspondingly programmed control unit (not shown), to rotate the rotor 14, the mirror holder 16 and the mirror 12 in a series of periodic back-and-forth rotation movements within a limited angular range, of for example 10°, leaving a rest time or a predefined period of time between successive back-and-forth rotations. A time evolution of such back-and-forth movement is schematically represented in the upper plot of FIG. 8, which illustrates a time evolution of the X-coordinate of the position signal registered by the laser beam position sensor 30 in time during a period of the periodic back-and-forth periodic movement including the aforesaid rest time. As a consequence of the back-and-forth rotation of the mirror 12, the deflected laser beam L' wanders back-and-forth on the sensing surface 32 in the X-direction and then stays at the original position during the programmed rest time.

If the mirror unit is not properly balanced, e. g. before performing the method according to the first aspect of the present invention, this unbalance manifests in the form of vibrations of the mirror unit 10 in the y-direction perpendicular to the mirror plane S (cf. FIG. 8) and/or to the balance plane (cf. FIG. 9), despite the fact that the mirror unit 10 is being rotated around a rotation axis R that is parallel to the Y-direction. Such vibrations cause the deflected laser beam L' to oscillate in a direction perpendicular to the rotation (e.g., in the y-direction indicated in FIG. 1) and this is registered by the laser beam position sensor 30, in particular during the rest time shown in the top plot of FIG. 10 in which the mirror unit is not rotating, as a corresponding oscillation of the position signal in the second sensing direction (Y-coordinate on the sensing surface 32) perpendicular to the first sensing direction in which the rotation of the mirror is registered (X-coordinate on the sensing surface 32). These oscillations are schematically represented in the lower plot of FIG. 10, which illustrates a time evolution of the Y-coordinate of the position signal in time during a period of the periodic back-and-forth periodic movement including the aforesaid rest time.

As schematically shown in FIG. 4, due to the uncontrolled oscillations of the mirror unit 10 in the y-direction, the deflected laser beam L' undergoes a deviation d from its ideal zero-position in the Y-direction on the sensing surface 32 of the laser beam position sensor 30 corresponding to a situation in which the mirror unit 10 were not vibrating at all in the y-direction. The deviation d corresponds to an angular deviation θ with respect to an imaginary deflected laser beam unaffected by vibrations of the mirror unit in the y-direction, which is indicated with a dashed-dotted line in FIG. 4. The greater the amplitude of the deviation d and/or the angular deviation θ, the more significant the unbalance of the mirror unit 10 in the y-direction is and the less precise a laser process using the mirror unit 10 shall be.

According to the invention, a balance of the mirror unit can be improved by configuring the balancing weights 20a, 20b (and possibly also 20c or 20c and 20d) such that the oscillations of the position signal in the Y-coordinate, which can also be represented in terms of phase and amplitude as a stationary periodic signal using an oscilloscope (not shown), are eliminated or at least reduced within a wished tolerance. For instance, the balancing weights 20a, 20b of FIGS. 1-3 and 5 attached to the mirror holder 16, in particular the masses thereof, can be selected for balancing the mirror unit.

Figure 10:
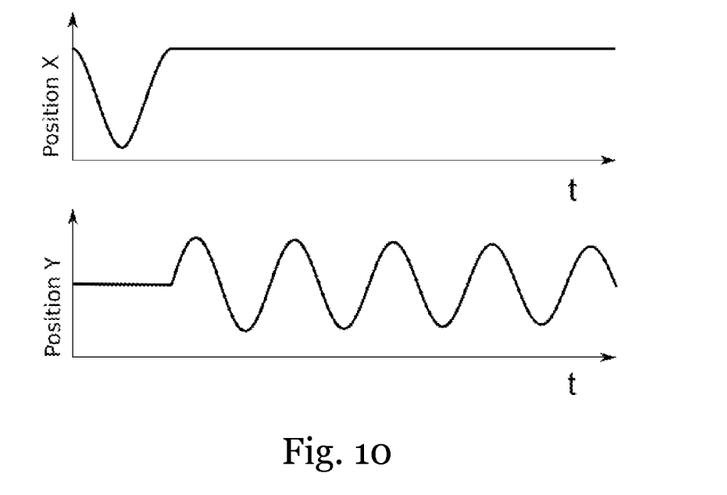
FIG. 10 shows schematic plots of a position signal registered by a laser beam position sensor in a method according to an embodiment of the invention.
Figure 11:
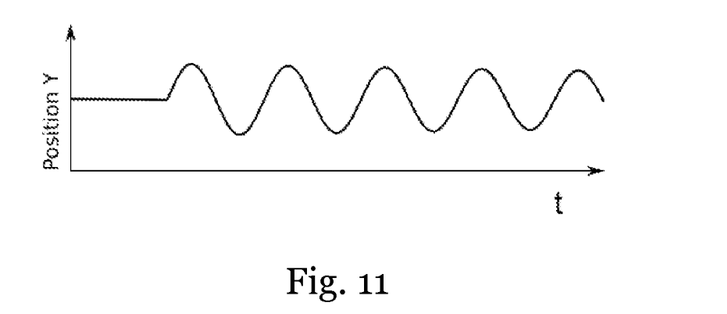
FIGS. 11-14 show schematic plots of the registration of the position signal in a Y-direction of a laser beam position sensor depending on different settings of the balancing weights.

For example, an oscillation pattern as schematically represented in FIG. 11 can be obtained by an oscilloscope connected to the laser beam position sensor 30 for a mirror unit without any balancing weights attached thereto, corresponding to the lower graph of FIG. 10. The presence of the oscillations, the amplitude of which is significant, for example greater than a predefined tolerance threshold, indicates that the mirror unit is not properly balanced. In order to balance the mirror unit, a first balancing weight (e.g. one of the balancing weights 20a or 20b illustrated in FIG. 2) having a mass m1 can be arranged in the corresponding opening (e.g. the respective one of the openings 22a or 22b illustrated in FIG. 2). As a result, the mass distribution of the mirror unit 10 will be modified in a xz-plane, in particular in the mirror plane S (cf. FIG. 8) and/or in the balance plane A (cf. FIG. 9), and its rotational behaviour will vary.

Figure 12:
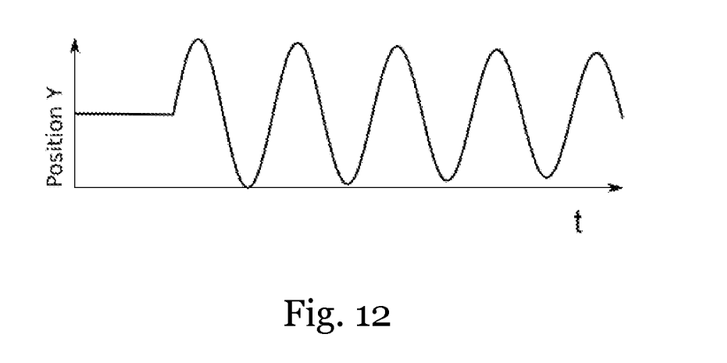

If, as a result of the incorporation of the first balancing weight with mass m1, an oscillation pattern with increased amplitude and unchanged phase is obtained, as schematically shown in FIG. 12 (compare to FIG. 11), this indicates that the mass m1 is too great and that the mirror unit is now further unbalanced due to an additional displacement of the mass distribution of the mirror unit in the aforesaid xz-plane towards the first balancing weight. This must be compensated by incorporating a second balancing weight (e.g., the other one of the balancing weights 20b or 20a illustrated in FIG. 2, respectively) with greater mass m2>m1 into the other one of the openings (e.g. the respective one of the openings 22b or 22a illustrated in FIG. 2) opposite the first balancing weight. Alternatively, the first balancing weight may be removed and a new balancing weight may be arranged on the other side of the rotation axis.

If instead, an oscillation pattern with a reduced amplitude and unchanged phase were obtained, this would indicate that the mass m1 is too small and the first balancing weight should be replaced by a new balancing weight having a mass m2>m1. For example, the balancing weight 20a illustrated in FIG. 2 should be replaced by a larger balancing weight 20a arranged in the same position, in the same opening 22a, but having a greater mass m2>m1.

Figure 13:
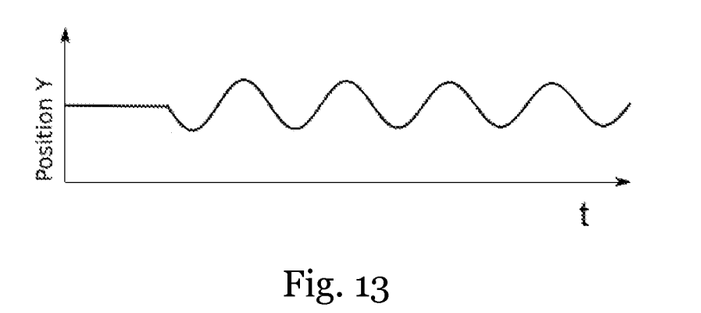

If, as a result of the incorporation of the first balancing weight with mass m1, an oscillation pattern with a phase changed by 180° is obtained, as schematically shown in FIG. 13 (compare to FIG. 11), this indicates that the mass m1 is too large and that the mirror unit is now oppositely unbalanced due to the mass distribution of the mirror unit being now predominantly on the other side of the rotation axis R closer the first balancing weight. This can be compensated by replacing the first balancing weight by a new balancing weight having a smaller mass m2<m1 or by incorporating a second balancing weight (e.g. the other one of the balancing weights 20b or 20a illustrated in FIG. 2, respectively) with reduced mass m2<m1 into the other one of the openings (e.g. the respective one of the openings 22b or 22a illustrated in FIG. 2) opposite the first balancing weight.

Figure 14:
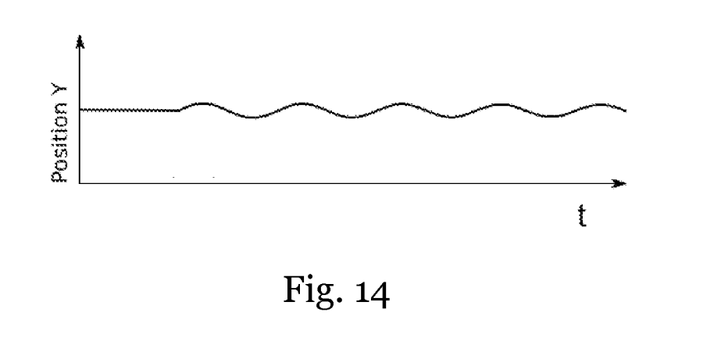

In any event, the masses of the balancing weights can be stepwise adapted, by correspondingly replacing the balancing weights by balancing weights with different masses, if necessary, such that the amplitudes of the oscillations registered by the laser beam position detector 30 reduces progressively until they are below a wished tolerance threshold, for example as schematically illustrated in FIG. 14. The mirror unit 10 can be deemed to be properly "balanced" within the context of the present invention.

The situation illustrated in FIG. 14 may correspond to a balancing of the mirror unit 10 using one or more of the balancing weights 20a, 20b, 20c and 20d such that the angular deviation θ (see FIG. 4) of the deflected laser beam L' is about 0° 0' 8" (i.e. about 3,92e-5 rad). For a distance between the mirror unit 10 (the optical centre thereof) and the laser beam position sensor 30 of for example 510 mm, the amplitude of the deviation d in the Y-direction measured on the sensing surface 32 of the laser beam position sensor 30 can be of about 20 μm. Such a small deviation, which is achieved thanks to the correct configuration of the balancing weights 20a and/or 20b, in particular thanks to a proper choice of the masses thereof, guarantees that a wobbling of the mirror unit 10 when rotating is limited to a wished tolerance, whereby good laser quality is ensured.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

The invention claimed is:

1. A method of balancing a mirror unit for a laser deflection device, wherein the mirror unit comprises:
   a mirror for deflecting a laser beam, wherein the mirror extends in a mirror plane parallel to a first direction and to a second direction perpendicular to the first direction;
   a rotor for rotating the mirror around a rotation axis parallel to the first direction; and
   a mirror holder holding the mirror to the rotor; and
   wherein the method comprises modifying a mass distribution of the mirror unit in said mirror plane or in a balance plane containing said rotation axis, by arranging one or more balancing weights on the mirror unit, wherein a centre of mass of the one or more balancing weights is arranged in said mirror plane or in said balance plane;
   wherein modifying a mass distribution of the mirror unit in said mirror plane or in said balance plane by arranging the one or more balancing weights on the mirror unit comprises:
   deflecting a laser beam with the mirror on a laser beam position sensor, wherein the laser beam position sensor registers a position of the deflected laser beam on the laser beam position sensor as a position signal, rotating the mirror unit around the rotation axis, thereby causing a translation of the position signal in a first sensing direction corresponding to said rotation; and
   measuring a deviation of the position signal in a second sensing direction perpendicular to the first sensing direction; and
   configuring the one or more balancing weights such as to reduce or eliminate the measured deviation of the position signal in the second sensing direction.

2. The method of claim 1, wherein rotating the mirror unit comprises cyclically rotating the mirror unit, in particular within a predefined angular range.

3. The method of claim 1, wherein the deviation of the position signal in the second sensing direction perpendicular to the first sensing direction is measured during a predefined period of time between each two successive rotations of the mirror unit, wherein the mirror unit remains static during the predefined period of time.

4. The method of claim 1, wherein configuring the one or more balancing weights such as to reduce or eliminate the measured deviation of the position signal in the second sensing direction comprises choosing a mass of each of the one or more balancing weights.

5. The method of claim 1, wherein the one or more balancing weights comprise balancing weights extending in said mirror plane or in said balance plane and/or an even number of balancing weights extending symmetrically with respect to said mirror plane or in said balance plane.

6. The method of claim 1, wherein at least one of the one or more balancing weights extends in the second direction.

7. The method of claim 1, wherein the mirror holder comprises one or more threaded openings and wherein the one or more balancing weights are configured as or comprise one or more screws, each insertable into a respective one of the one or more threaded openings;
   wherein arranging the one or more balancing weights on the mirror unit comprises screwing the one or more screws within the respective threaded openings.

8. The method of claim 1, wherein the one or more balancing weights comprise at least two balancing weights arranged on opposite sides of the rotation axis.

9. A mirror unit for a laser deflection device comprising:
a mirror for deflecting a laser beam, wherein the mirror extends in a mirror plane parallel to a first direction and to a second direction perpendicular to the first direction;
a rotor for rotating the mirror around a rotation axis parallel to the first direction;
a mirror holder holding the mirror to the rotor; and
one or more balancing weights attached to the mirror unit, wherein a centre of mass of the one or more balancing weights is arranged in said mirror plane or in a balance plane parallel containing said rotation axis;
wherein the one or more balancing weights are configured such that when a laser beam is deflected with the mirror upon a laser beam position sensor registering a position of the deflected laser beam on the laser beam position sensor as a position signal and the mirror unit is rotated around the rotation axis thereby causing a translation of the position signal in a first sensing direction corresponding to said rotation, a deviation of the position signal in a second sensing direction perpendicular to the first sensing direction is smaller than in absence of the one or more balancing weights;
wherein the one or more balancing weights comprise only balancing weights extending in the mirror plane or in the balance plane and/or only balancing weights extending pairwise symmetric with respect to the mirror plane or to the balance plane;
wherein the mirror unit is free of balancing weights that are not arranged extending in the mirror plane or in the balance plane or extending pairwise symmetric with respect to the mirror plane or to the balance plane.

10. The mirror unit of claim 9, wherein said deviation of the position signal in the second sensing direction corresponds to an angular deviation of the laser beam smaller than 1 minute, preferably smaller than 30 seconds, more preferably smaller than 15 seconds, in particular when the mirror unit is rotated about a predefined rotation angle at a rotation speed from 5 rad/s to 200 rad/s, preferably from 15 rad/s to 150 rad/s.

11. The mirror unit of claim 9, wherein the one or more balancing weights comprise balancing weights extending in said mirror plane and/or an even number of balancing weights extending symmetrically with respect to said mirror plane.

12. The mirror unit of claim 9, wherein the mirror holder comprises one or more openings for receiving the one or more balancing weights, wherein the one or more openings extend perpendicular to the rotation axis.

13. The mirror unit of claim 12, wherein all openings of the mirror holder have the same depth and/or the same diameter.

14. The mirror unit of claim 9, wherein at least one of the one or more balancing weights extend perpendicular to the rotation axis, preferably in the second direction.

15. The mirror unit of claim 9, wherein the one or more balancing weights are configured as or comprise one or more screws insertable into respective one or more threaded openings in the mirror holder.

16. The mirror unit of claim 9, wherein the one or more balancing weights comprise one or more balancing weights arranged on opposite sides of the rotation axis.

17. A mirror unit for a laser deflection device comprising:
a mirror for deflecting a laser beam, wherein the mirror extends in a mirror plane parallel to a first direction and to a second direction perpendicular to the first direction;
a rotor for rotating the mirror around a rotation axis parallel to the first direction;
a mirror holder holding the mirror to the rotor; and
at least two balancing weights attached to the mirror unit, wherein a centre of mass of the at least two balancing weights is arranged in said mirror plane;
wherein the at least two balancing weights are configured such that when a laser beam is deflected with the mirror upon a laser beam position sensor registering a position of the deflected laser beam on the laser beam position sensor as a position signal and the mirror unit is rotated around the rotation axis thereby causing a translation of the position signal in a first sensing direction corresponding to said rotation, a deviation of the position signal in a second sensing direction perpendicular to the first sensing direction is smaller than in absence of the at least two balancing weights.

18. The mirror unit of claim 17, wherein the at least two balancing weights comprise balancing weights extending in said mirror plane and/or an even number of balancing weights extending symmetrically with respect to said mirror plane.

19. The mirror unit of claim 17, wherein the mirror holder comprises at least two openings for receiving at least two balancing weights, wherein the at least two openings extend perpendicular to the rotation axis.

20. The mirror unit of claim 17, wherein the at least two balancing weights are configured as or comprise at least two screws insertable into respective at least two threaded openings in the mirror holder.

* * * * *